(12) United States Patent
Buettner et al.

(10) Patent No.: US 9,118,124 B2
(45) Date of Patent: Aug. 25, 2015

(54) CARRIER RAIL ADAPTER

(71) Applicant: Woehner GmbH & Co. KG Elektrotechnische Systeme, Roedental (DE)

(72) Inventors: Alex Buettner, Roedental (DE); Christopher Curth, Neustadt (DE)

(73) Assignee: Woehner GmbH & Co. KG, Roedental (DE)

( * ) Notice: Subject to any disclaimer, the term of this patent is extended or adjusted under 35 U.S.C. 154(b) by 85 days.

(21) Appl. No.: 13/865,857

(22) Filed: Apr. 18, 2013

(65) Prior Publication Data

US 2013/0280934 A1 Oct. 24, 2013

(30) Foreign Application Priority Data

Apr. 20, 2012 (DE) .................. 10 2012 206 600

(51) Int. Cl.
*H01R 9/26* (2006.01)
*H02B 1/052* (2006.01)
*H01R 13/62* (2006.01)

(52) U.S. Cl.
CPC .............. *H01R 9/2608* (2013.01); *H01R 13/62* (2013.01); *H02B 1/052* (2013.01); *H02B 1/0523* (2013.01)

(58) Field of Classification Search
CPC ....... H01R 9/26; H01R 9/2408; H01R 9/2608
USPC ......................................................... 439/716
See application file for complete search history.

(56) References Cited

U.S. PATENT DOCUMENTS

| 4,472,764 | A | | 9/1984 | Richard et al. | |
|---|---|---|---|---|---|
| 4,872,092 | A | * | 10/1989 | Lush et al. | 361/823 |
| 5,049,094 | A | * | 9/1991 | Heng et al. | 439/716 |
| 5,299,957 | A | * | 4/1994 | Schaeffer | 439/712 |
| 5,641,313 | A | * | 6/1997 | Hohorst | 439/709 |
| 5,658,172 | A | * | 8/1997 | Schmidt et al. | 439/716 |
| 5,820,420 | A | * | 10/1998 | Bechaz et al. | 439/716 |
| 6,146,213 | A | * | 11/2000 | Yoon | 439/716 |

(Continued)

FOREIGN PATENT DOCUMENTS

| CN | 1933245 A | 3/2007 |
|---|---|---|
| DE | 2523197 A1 | 12/1976 |

(Continued)

OTHER PUBLICATIONS

German Search Report dated Feb. 20, 2014 corresponding to European application No. EP 13 16 0809 (6 pages).

(Continued)

*Primary Examiner* — Ross Gushi
(74) *Attorney, Agent, or Firm* — Maginot, Moore & Beck, LLP

(57) ABSTRACT

A carrier rail adapter for an electric installation device, wherein the carrier rail adapter has a housing, to the lower side of which a latching component is attached which can be actuated by means of a locking and unlocking mechanism in order to attach the carrier rail adapter to a carrier rail or to remove the carrier rail adapter from the carrier rail, and on the upper side of which inner contact devices for connection of the electric installation device are provided, which are connected to connection terminals via inner conductors located in the housing, which connection terminals are provided on an end face of the housing for connection of electric lines.

13 Claims, 3 Drawing Sheets

(56) References Cited

U.S. PATENT DOCUMENTS

| | | | |
|---|---|---|---|
| 6,563,697 | B1 | 5/2003 | Simbeck et al. |
| 6,848,951 | B1* | 2/2005 | Bechaz et al. ............... 439/716 |
| 7,192,316 | B1* | 3/2007 | Pollmann ...................... 439/716 |
| 7,307,227 | B2* | 12/2007 | Buettner .................... 200/51.11 |
| 7,491,096 | B1* | 2/2009 | Correll .......................... 439/716 |
| 7,549,878 | B2* | 6/2009 | Brada et al. .................. 439/188 |
| 7,666,005 | B2* | 2/2010 | Heggemann et al. ........ 439/76.1 |
| 7,690,952 | B2* | 4/2010 | Koellmann et al. .......... 439/716 |
| 7,753,739 | B2* | 7/2010 | Bentler et al. ................ 439/709 |
| 8,647,157 | B2* | 2/2014 | Gan et al. ...................... 439/716 |
| 8,715,017 | B1* | 5/2014 | Barber et al. ................. 439/716 |
| 2001/0034165 | A1* | 10/2001 | Landis et al. ................. 439/716 |
| 2005/0221685 | A1* | 10/2005 | Brada et al. .................. 439/716 |
| 2006/0243569 | A1 | 11/2006 | Buettner |
| 2007/0049129 | A1* | 3/2007 | Pollmann ...................... 439/716 |
| 2011/0177724 | A1* | 7/2011 | Pizzi ............................. 439/716 |
| 2013/0133716 | A1* | 5/2013 | Buettner ....................... 136/244 |
| 2013/0280934 | A1* | 10/2013 | Buettner et al. .............. 439/153 |

FOREIGN PATENT DOCUMENTS

| | | |
|---|---|---|
| DE | 4121836 A1 | 1/1993 |
| DE | 4421267 | 1/1996 |
| DE | 20108460 U1 | 11/2001 |
| DE | 10061940 | 7/2002 |
| DE | 10061940 A1 | 7/2002 |
| DE | 102008064450 A1 | 6/2010 |
| FR | 2830677 | 4/2003 |
| WO | WO2004073127 | 8/2004 |

OTHER PUBLICATIONS

Chinese Office Action dated Dec. 26, 2014 corresponding to Chinese patent application No. 201310136680.5 (6 pages).

* cited by examiner

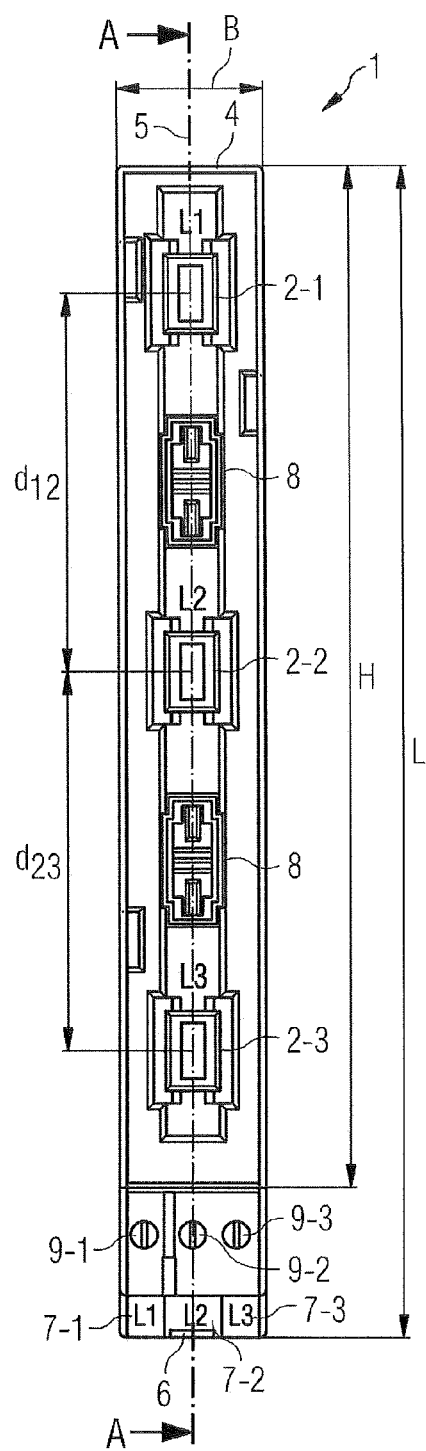
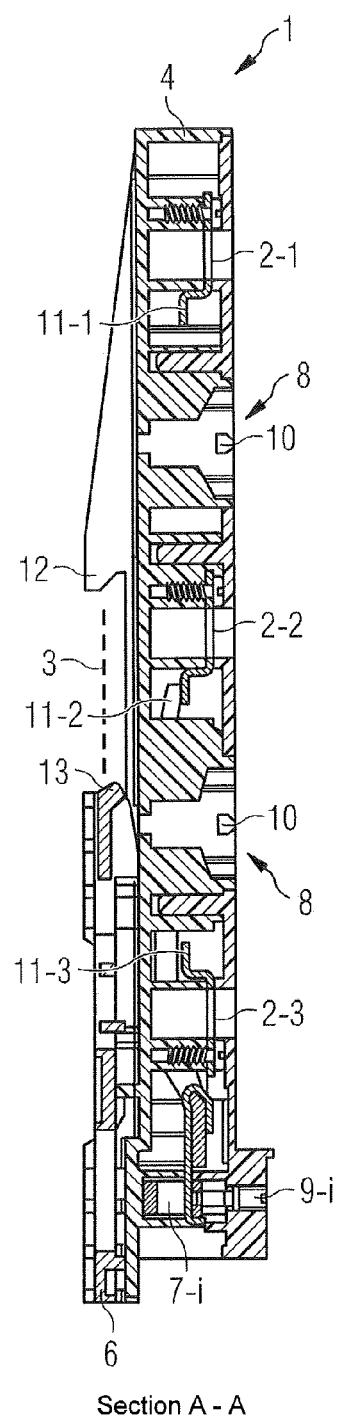

CARRIER RAIL ADAPTER

BACKGROUND

The invention relates to a carrier rail adapter for an electric installation device.

A carrier rail is a metal profile rail which is used to attach components or electric installation devices in distribution boxes, switch cabinets, connection boxes and the like. By means of a carrier rail it is possible for different electric installation devices, for example switches, automatic cut-outs, series terminals, relays or time switches to be pushed on or plugged in from the front, and locked. A carrier rail with a U-shaped or a cap-like profile is also designated as a cap rail. Electric installation devices with the capability of being attached to a carrier rail have input and output terminals, usually on the device itself, to receive electric lines.

SUMMARY

An object of the present invention is to create a carrier rail adapter for an electric installation device, which permits safe device replacement under voltage.

This object is achieved in accordance with the invention by a carrier rail adapter having the features stated in claim 1.

The invention accordingly creates a carrier rail adapter for an electric installation device, wherein the carrier rail adapter has a narrow housing, to the lower side of which a latching component is attached which can be actuated by means of a locking and unlocking mechanism in order to attach the carrier rail adapter to a carrier rail or to remove the carrier rail adapter from the carrier rail, and on the upper side of which inner contact devices for connection of the electric installation device are provided, which are connected to connection terminals via inner conductors located in the housing, which connection terminals are provided on an end face of the housing for connection of electric lines.

Possible embodiments of the carrier rail adapter in accordance with the invention are stated in the subordinate claims.

In one possible embodiment of the carrier rail adapter in accordance with the invention, the locking and unlocking mechanism is attached to the end face of the housing below the connection terminals for the electric lines and can be actuated only after removal of the electric lines.

In one possible embodiment of the carrier rail adapter in accordance with the invention, the contact devices for connection of the electric installation device are plug-in contacts.

In one possible embodiment of the carrier rail adapter in accordance with the invention, the contact devices for connection of the installation device are disposed linearly one above the other on the upper side of the narrow housing.

In one possible embodiment of the carrier rail adapter in accordance with the invention, the connection terminals disposed on the end face are provided for connection of three voltage-carrying phasing lines.

In one possible embodiment of the carrier rail adapter in accordance with the invention, a hammer head-shaped holding web for holding the locking and unlocking mechanism is integrally formed on a housing.

In one possible embodiment of the carrier rail adapter in accordance with the invention, the locking and unlocking mechanism is provided with a holding contour which is pushed under the holding web of the housing.

Possible embodiments of the inventive carrier rail adapter for an electric installation device are explained in more detail hereinunder with reference to the attached figures in which:

DESCRIPTION OF THE FIGURES

FIG. 2 shows a plan view of the carrier rail adapter in accordance with FIG. 1;

FIG. 3 shows a cross-sectional view of the carrier rail adapter in accordance with FIG. 2;

DETAILED DESCRIPTION

Figure 1:
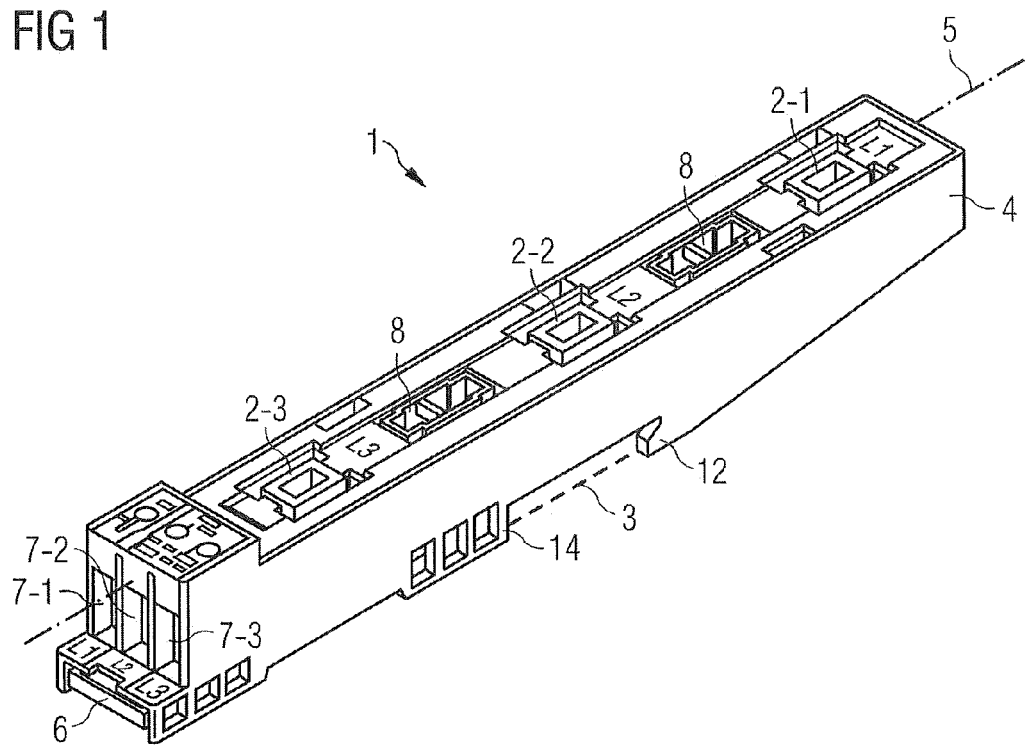
FIG. 1 shows a perspective view from above of a carrier rail adapter in accordance with one embodiment of the invention.

FIG. 1 shows a perspective view of a carrier rail adapter 1 in accordance with one embodiment of the invention. In the exemplified embodiment illustrated in FIG. 1, the carrier rail adapter 1 has three contact devices 2-1, 2-2, 2-3 to which at least one installation device can be connected. In one possible embodiment, the contact devices 2-$i$ for connection of the electric installation device are plug-in contacts, i.e. a connection wire of the installation device can be introduced into the contact devices 2-$i$ and is then held mechanically. The carrier rail adapter 1 has a narrow housing 4, wherein, as shown in FIG. 1, the contact devices 2-$i$ lie on the upper side of the housing 4 and are preferably integrated in the housing 4 or lie therein. The contact devices 2-$i$ preferably form plug-in contacts which are disposed in the housing 4 in such a way that they cannot be touched when the carrier rail adapter 1 is being handled. On the lower side of the housing 4, the housing is formed in such a way that it can be mounted or latched onto a carrier rail 3 indicated as a broken line. The housing 4 of the carrier rail adapter 1 in accordance with the invention is preferably narrow in formation, wherein the contact devices 2-$i$ are preferably disposed linearly one above the other along a longitudinal axis 5. The carrier rail adapter 1 in accordance with the invention is formed symmetrically with respect to the longitudinal axis 5, as shown in FIG. 1. On the lower side of the housing 5, a latching component 6 is attached on the end face and can be actuated by means of a locking and unlocking mechanism in order to attach the carrier rail adapter 1 to the carrier rail 3 or to remove the carrier rail adapter 1 from the carrier rail 3. In the exemplified embodiment illustrated in FIG. 1, the carrier rail adapter 1 also has three connection terminals 7-1, 7-2, 7-3 which are provided to connect three voltage-carrying phasing lines L1, L2, L3. As shown by FIG. 1, the latching component 6, which can be actuated manually by means of a locking and unlocking mechanism to attach the carrier rail adapter 1 to the carrier rail 3 or to remove the carrier rail adapter 1 from the carrier rail 3, is attached below the connection terminals 7-$i$ for the electric lines and can thus be actuated only after the electric lines have been removed. In the mounted state, the locking and unlocking mechanism can be held in each case on housing walls 14 of the housing 4.

As shown in FIG. 1, the contact devices 2-$i$ of the carrier rail adapter 1 are disposed linearly one above the other so that the housing 5 can be narrow in formation and takes up little space on a carrier rail 3. The carrier rail adapter 1 in accordance with the invention can therefore be attached to a carrier rail or cap rail in a space-saving manner. Furthermore, the three contact devices 2-1, 2-2, 2-3 are disposed preferably symmetrically on the upper side of the housing 4, i.e. the spacing between the first contact device 2-1 and the second contact device 2-2 is preferably exactly the same size as the spacing between the second contact device 2-2 and the third contact device 2-3. In the exemplified embodiment illustrated in FIG. 1, attachment devices 8 for attaching an installation device to the carrier rail adapter 1 can additionally be provided between two contact devices 2-$i$. In the exemplified embodiment illustrated in FIG. 1, two attachment devices 8 are provided. The attachment devices 8 are formed in such a way that, for example, a latching element of an associated installation device can be received therein. With the aid of the carrier rail adapter 1 in accordance with the invention, it is possible to remove an installation device easily in the event of a malfunction. The voltage-carrying supply lines, which are connected to the connection terminals 7-1, 7-2, 7-3, do not have to be removed for this purpose. The installation device can be mechanically unlocked and removed. An installation device is then newly installed in a reverse sequence.

Even when the installation device is being changed, the carrier rail adapter 1 remains protected against being touched owing to its specially formed plug openings or contact devices 2-$i$ and constitutes no danger for the operator.

Removal of the carrier rail adapter 1 from the carrier rail 3 is effected with the aid of the latching element 6, which can be actuated by means of a locking and unlocking mechanism, as shown in FIG. 1. This latching element 6 is deliberately disposed on the end face at the bottom of the carrier rail adapter 1 so that the electric lines thereabove have to be removed by a user only in order to reach the locking and unlocking mechanism.

FIG. 2 shows a plan view of the carrier rail adapter 1 illustrated in a perspective view in FIG. 1. The spacing $d_{12}$ between the first contact device 2-1 and the second contact device 2-2 is preferably exactly the same size as the spacing $d_{23}$ between the second contact device 2-2 and the third contact device 2-3 in the exemplified embodiment illustrated in FIG. 2. The housing 4 of the carrier rail adapter 1 has a total length L of, for example, 185 mm. The spacings d between the contact devices 2-$i$ are, for example, 60 mm. The width B of the housing 4 is, for example, 22.5 mm. As shown in FIG. 2, a portion for the connection terminals 7-1, 7-2, 7-3 is located on the lower end face of the housing 4, the remaining height H of the housing 4 is, for example, 161.5 mm. Therefore, the housing portion for the connection terminals in this embodiment has a width of 185 minus 161.5 mm=23.5 mm. Locking screws 9-1, 9-2, 9-3 are provided on the upper side of the housing 4 for the connection terminals 7-1, 7-2, 7-3 in the illustrated exemplified embodiment.

The attachment devices 8 can each comprise a latching device 10, for example in the form of a holding web. The holding web can extend along a transverse axis of the opening in the attachment device 8. The holding web can be formed in such a way that a latching element of the installation device to be attached can latch therein or therebehind. In this way, the installation device can latch in the opening in the attachment device 8 and be attached to the carrier rail adapter 1. As shown in FIG. 2, the two attachment devices 8 are disposed symmetrically between the contact devices 2-$i$. By means of this symmetrical arrangement of the attachment devices 8, an installation device rotated by 180° can also be placed onto the carrier rail adapter 1 and be attached by means of the attachment devices 8.

The attachment devices 8 are preferably also constructed symmetrically as shown in the exemplified embodiment. The attachment devices 8 preferably lie on the longitudinal axis 5 of the housing 4 as shown in FIG. 2. The attachment devices 8 are disposed together with the contact devices 2-$i$ symmetrically with respect to the common longitudinal axis 5. The housing 4 of the carrier rail adapter 1 is preferably produced from an insulating material. The housing 4 of the carrier rail adapter 1 consists, for example, of an insulating synthetic material.

As shown in FIG. 3, the contact devices 2-$i$ are preferably formed as plug-in contacts and each contact an inner conductor 11-$i$. The three inner conductors 11-1, 11-2, 11-3 are each electrically conductive and extend within the housing 4 to associated connection terminals 7-1, 7-2, 7-3. The first inner conductor 11-1 of the first contact device 2-1 is connected to the first connection terminal 7-1 for a phasing line L1. The second inner conductor 11-2 of the second contact device 2-2 is connected to the connection terminal 7-2 for a second phasing line L2. The third inner conductor 11-3 is connected to the third connection terminal 7-3 for the third phasing line L3. With the aid of the latching component 6, the housing 4 of the carrier rail adapter 1 can be mounted and/or latched onto the carrier rail 3 shown in broken lines. This is effected by means of a locking and unlocking mechanism. An operator can mechanically actuate the latching component 6 after removing the external connection lines, for example phasing lines, from the connection terminals 7-$i$, and in this way can release the carrier rail adapter 1 from the carrier rail 3. As shown in FIG. 3, the housing 4 of the carrier rail adapter 1 is formed on the lower side of the housing 4 on the side facing the upper end face, in such a way that at that location a housing lug 12 is provided which permits latching onto the carrier rail 3. The opposing latching lug 13 is connected to the latching component 6 mechanically in a displaceable manner by actuation of the latching component 6 via a locking and unlocking mechanism.

Figure 4:
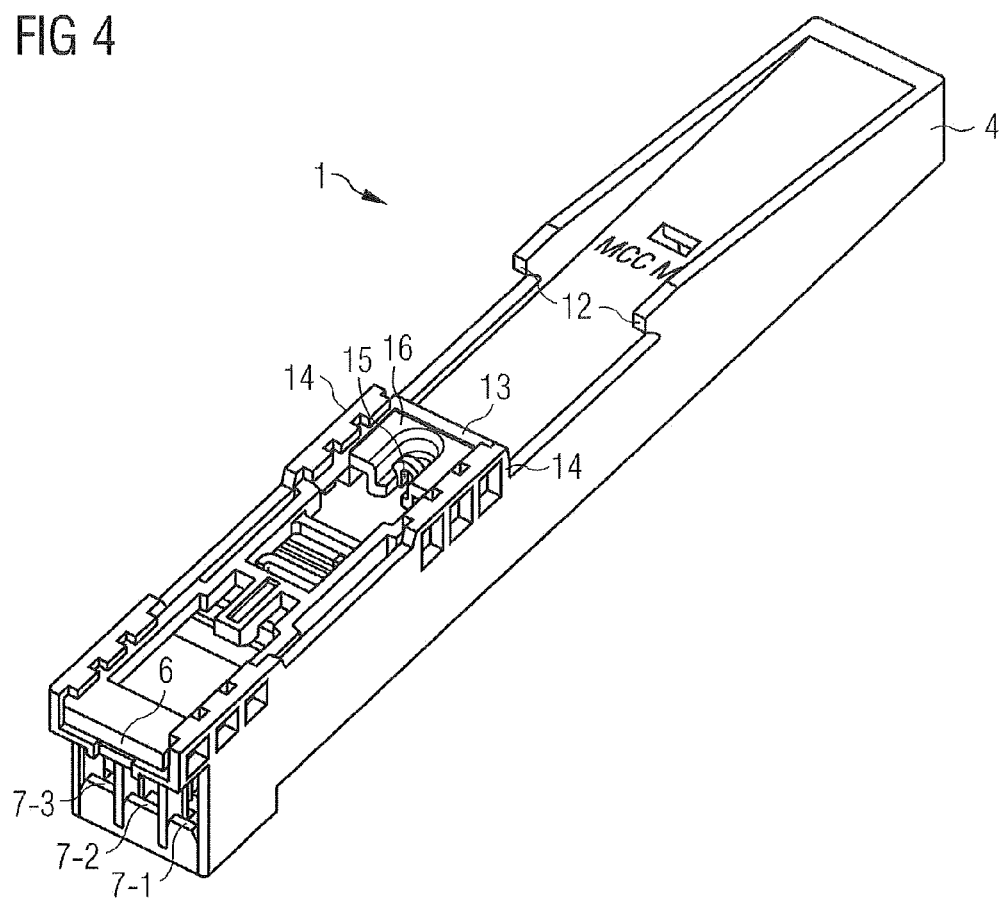
FIG. 4 shows a perspective view from below of a carrier rail adapter in accordance with one embodiment of the invention.

FIG. 4 shows a perspective view from below of a carrier rail adapter 1 in accordance with one embodiment of the invention. FIG. 4 shows the mounted locking and unlocking mechanism which, by actuation of the latching element 6, moves a latching lug 13 to latch the carrier rail adapter 1 on a carrier rail 3. In the exemplified embodiment shown in FIG. 4, the locking and unlocking mechanism is held in the mounted state on the housing walls 14 of the housing 4. In the exemplified embodiment shown in FIG. 4, a hammer head-shaped holding web 15 is additionally integrally formed on the adapter housing 4 of the carrier rail adapter 1 and mechanically holds the locking and unlocking mechanism especially during heavy mechanical loading. For this purpose, the locking and unlocking mechanism is provided with a holding contour 16 preferably open on one side in this region. When the locking and unlocking mechanism is being mounted onto the carrier rail adapter 1, the locking and unlocking mechanism is pushed, from the open side, under the holding web 15 and remains in this position. During unlocking and in the operating state, the carrier rail adapter 1 is therefore fixedly held in a stable manner so that the housing 4 of the carrier rail adapter 1 is not destroyed even under extreme mechanical loading and it is not possible to remove the carrier rail adapter 1 from the carrier rail 3 unintentionally.

The invention therefore creates a carrier rail adapter 1 with integrated contact devices 2-$i$ which are preferably integrated in the electrically insulating housing 4. The number of contact devices can differ in other embodiments. For example, it is possible for the carrier rail adapter 1 also to have only two contact devices 2-$i$. Furthermore, in the exemplified embodiment illustrated in the figures the connection terminals 7-$i$ are disposed at the bottom on the end face. In alternative embodiments, the connection terminals can also be disposed at a different position, for example, on the end face at the top or side of the housing 4.

REFERENCE LIST 1 carrier rail adapter
2 contact devices 3 carrier rail
4 housing
5 longitudinal axis
6 latching component
7 connection terminals
8 attachment devices
9 locking screws
10 attachment web
11 inner conductor
12 housing lug
13 latching lug
14 housing wall
15 holding web
16 holding contour

The invention claimed is:

1. A carrier rail adapter for an electric installation device, comprising:
    a housing;
    a latching component attached to a lower side of the housing, said latching component actuatable by a locking and unlocking mechanism in order to attach the carrier rail adapter to a carrier rail or to remove the carrier rail adapter from the carrier rail; and
    inner contact devices on an opposite upper side of the housing, said inner contact devices configured for electrical connection of the electric installation device and connected to connection terminals via inner conductors located in the housing, which connection terminals are provided on an end face of the housing for connection of electric lines,
    wherein the connection terminals disposed on the end face are provided for connection of at least three voltage-carrying phasing lines.

2. The carrier rail adapter as claimed in claim 1, wherein the locking and unlocking mechanism is attached to the end face of the housing below the connection terminals for the electric lines and wherein the latching component is attached below the connection terminals.

3. The carrier rail adapter as claimed in claim 2, wherein the contact devices for connection of the electric installation device are plug-in contacts.

4. The carrier rail adapter as claimed in claim 2, wherein the contact devices for connection of the electric installation device are disposed linearly and sequentially along the upper side of the housing.

5. The carrier rail adapter as claimed in claim 2, wherein a hammer head-shaped holding web for holding the locking and unlocking mechanism is integrally formed on the housing.

6. The carrier rail adapter as claimed in claim 1, wherein the contact devices for connection of the electric installation device are plug-in contacts.

7. The carrier rail adapter as claimed in claim 6, wherein the contact devices for connection of the electric installation device are disposed linearly and sequentially along the upper side of the housing.

8. The carrier rail adapter as claimed in claim 6, wherein a hammer head-shaped holding web for holding the locking and unlocking mechanism is integrally formed on the housing.

9. The carrier rail adapter as claimed in claim 1, wherein the contact devices for connection of the electric installation device are disposed linearly and sequentially along the upper side of the housing.

10. The carrier rail adapter as claimed in claim 9, wherein a hammer head-shaped holding web for holding the locking and unlocking mechanism is integrally formed on the housing.

11. The carrier rail adapter as claimed in claim 1, wherein a hammer head-shaped holding web for holding the locking and unlocking mechanism is integrally formed on the housing.

12. A carrier rail adapter for an electric installation device, comprising:
    a housing;
    a latching component attached to a lower side of the housing, said latching component actuatable by a locking and unlocking mechanism in order to attach the carrier rail adapter to a carrier rail or to remove the carrier rail adapter from the carrier rail; and
    inner contact devices on an opposite upper side of the housing, said inner contact devices configured for electrical connection of the electric installation device and connected to connection terminals via inner conductors located in the housing, which connection terminals are provided on an end face of the housing or connection of electric lines,
    wherein a hammer head-shaped holding web for holding the locking and unlocking mechanism is integrally formed on the housing.

13. The carrier rail adapter as claimed in claim 12, wherein the locking and unlocking mechanism is provided with a holding contour which is pushed under the holding web of the housing.

* * * * *